(12) United States Patent
Bennett

(10) Patent No.: US 8,731,171 B2
(45) Date of Patent: May 20, 2014

(54) CONTROLLED RECORDED 3-WAY CALLING

(71) Applicant: World Emergency Network—Nevada Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 0 days.

(21) Appl. No.: 14/086,547

(22) Filed: Nov. 21, 2013

(65) Prior Publication Data

US 2014/0087692 A1    Mar. 27, 2014

Related U.S. Application Data

(63) Continuation of application No. 13/631,621, filed on Sep. 28, 2012.

(60) Provisional application No. 61/546,342, filed on Oct. 12, 2011.

(51) Int. Cl.
*H04M 3/42*    (2006.01)

(52) U.S. Cl.
USPC .................. 379/207.01; 379/133; 379/203.01

(58) Field of Classification Search
CPC ....... H03M 3/56; H03M 3/2281; H03M 3/38; H03M 3/4228; H03M 3/54; H03M 3/568; H03M 2203/5063; H03M 11/04; H03M 3/36; H03M 15/00; H03M 3/5175
USPC ................ 379/32.01, 38, 49, 100.05, 106.02, 379/114.01, 133, 202.01–205.01, 207.01, 379/265.06
See application file for complete search history.

(56) References Cited

U.S. PATENT DOCUMENTS

| | | | |
|---|---|---|---|
| 5,974,309 A | 10/1999 | Foti | |
| 6,301,246 B1 * | 10/2001 | Shaffer et al. | 370/352 |
| 6,356,630 B1 | 3/2002 | Cai et al. | |
| 6,449,474 B1 | 9/2002 | Mukherjee et al. | |
| 6,553,025 B1 | 4/2003 | Kung et al. | |

(Continued)

FOREIGN PATENT DOCUMENTS

| | | | | |
|---|---|---|---|---|
| JP | 2007166089 | * | 6/2007 | ............... H04Q 3/58 |
| WO | WO 2012/166729 | | 12/2012 | |
| WO | WO 2013/003779 | | 1/2013 | |

OTHER PUBLICATIONS

Patent Cooperation Treaty, International Search Report and Written Opinion, International Patent Application No. PCT/US2012/039857, Aug. 27, 2012, 13 pages.

(Continued)

*Primary Examiner* — Oleg Asanbayev
(74) *Attorney, Agent, or Firm* — Fenwick & West LLP

(57) ABSTRACT

Agencies issue recording devices to personnel for administrating and monitoring controlled calls during the course of their duties. To provide flexible capabilities to agencies, a virtual number is provisioned and configured to enable an operator to administrate controlled calls without dedicated recording devices. Using the virtual number, the operator may setup a controlled call between a victim and a baddie. The victim is contacted via the virtual number by the operator and optionally informed about the controlled call process. In turn, the baddie is contacted using number information of the victim's phone and connected with the victim. Call audio between the victim and baddie is transmitted to the operator. When necessary, the operator may terminate the call remotely from the telephonic device the operator used to setup the call.

20 Claims, 8 Drawing Sheets

(56) References Cited

U.S. PATENT DOCUMENTS

| | | |
|---|---|---|
| 6,931,236 B2 | 8/2005 | Kaplan |
| 7,181,017 B1 | 2/2007 | Nagel et al. |
| 7,873,349 B1 | 1/2011 | Smith et al. |
| 8,265,597 B2 | 9/2012 | Smith et al. |
| 2001/0019604 A1 | 9/2001 | Joyce et al. |
| 2001/0036821 A1 | 11/2001 | Gainsboro et al. |
| 2002/0132638 A1 | 9/2002 | Plahte et al. |
| 2002/0181460 A1 | 12/2002 | Strathmeyer et al. |
| 2003/0144024 A1 | 7/2003 | Luo |
| 2004/0151288 A1 | 8/2004 | Lee |
| 2004/0152442 A1* | 8/2004 | Taisto et al. .......... 455/406 |
| 2005/0074104 A1 | 4/2005 | Swartz |
| 2005/0111629 A1 | 5/2005 | Carlson et al. |
| 2005/0277407 A1 | 12/2005 | Ahn et al. |
| 2006/0034426 A1* | 2/2006 | Freudenberger et al. ..... 378/125 |
| 2006/0140200 A1 | 6/2006 | Black et al. |
| 2007/0036127 A1 | 2/2007 | Roosen et al. |
| 2008/0045186 A1 | 2/2008 | Black et al. |
| 2009/0119100 A1 | 5/2009 | Akella et al. |
| 2011/0002480 A1 | 1/2011 | Smith et al. |
| 2011/0026701 A1 | 2/2011 | Kirchhoff et al. |
| 2011/0046920 A1 | 2/2011 | Amis |
| 2011/0081009 A1 | 4/2011 | Ma et al. |

OTHER PUBLICATIONS

Patent Cooperation Treaty, International Search Report and Written Opinion, International Patent Application No. PCT/US2012/045052, Sep. 25, 2012, 16 pages.

Patent Cooperation Treaty, International Search Report and Written Opinion, International Patent Application No. PCT/US2012/060102, Jan. 11, 2013, 14 pages.

* cited by examiner

Map Virtual
Number
350A ↘

| Mapping Table 360A ||
| Authentication Number (Transmitting Number) 361A | Controlled Call Number 363 |
| 555-111-2222 ⟷ | 555-999-8888 |
| 555-111-2222 ⟷ | 555-999-7777 |

FIG. 3B

Map Virtual
Number
350B ↘

| Mapping Table 360B ||
| Authentication Number PIN 361B | Controlled Call Number 363 |
| 12345 ⟷ | 555-999-8888 |
| 54321 ⟷ | 555-999-7777 |

FIG. 3C

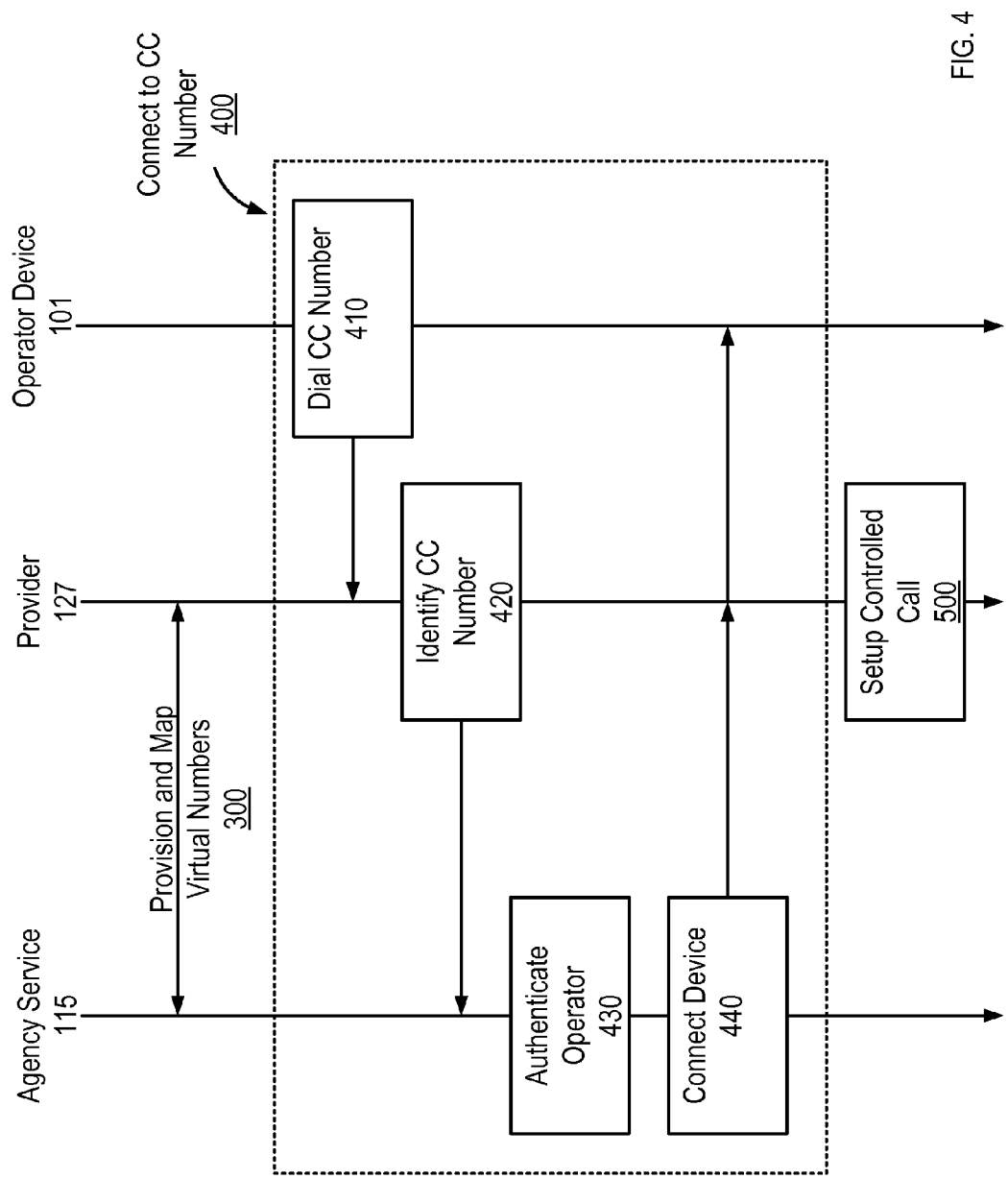

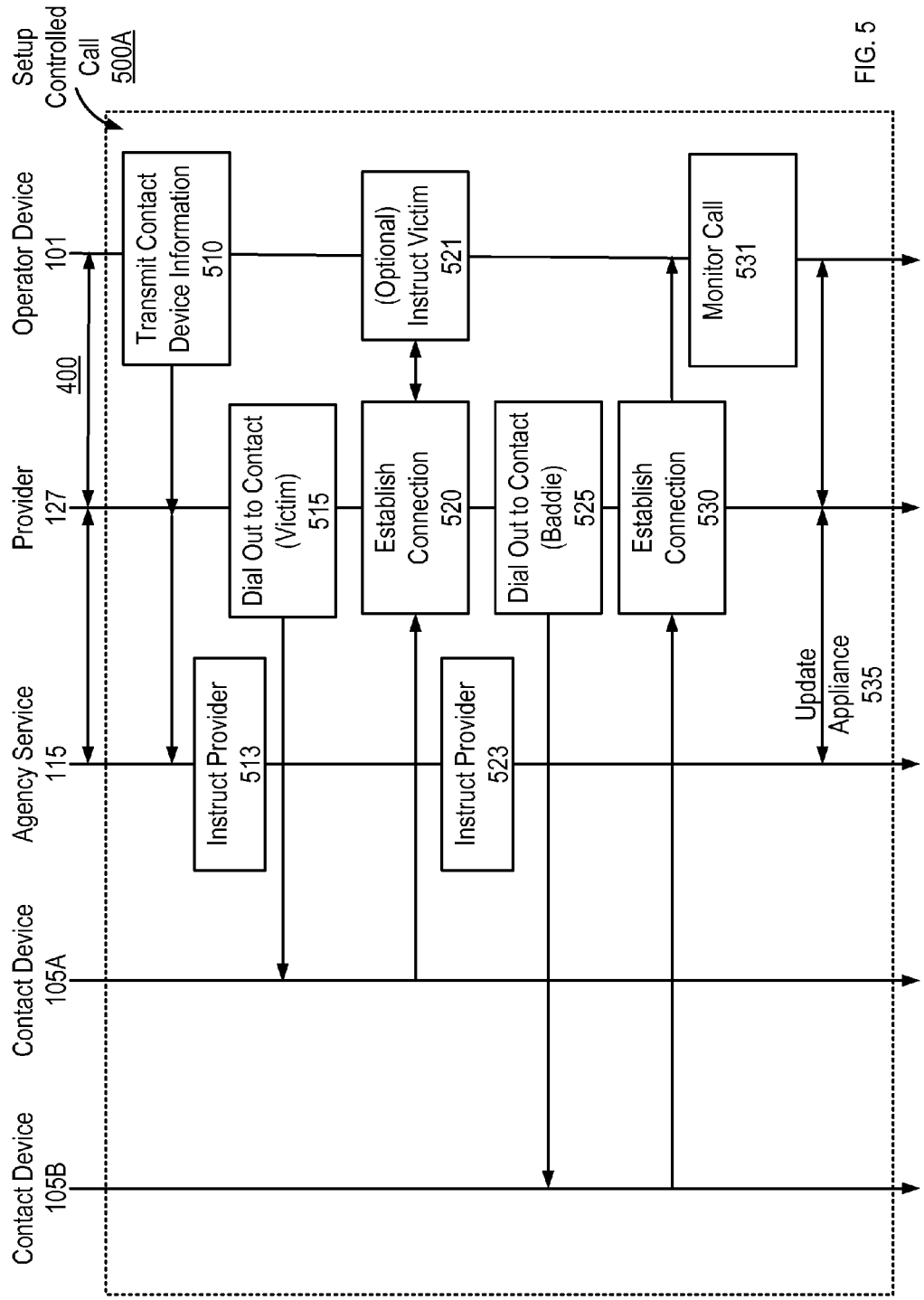

CONTROLLED RECORDED 3-WAY CALLING

CROSS REFERENCE TO RELATED APPLICATIONS

This application is a continuation of co-pending U.S. application Ser. No. 13/631,621, filed on Sep. 28, 2012, which claims the benefit of U.S. Provisional Application No. 61/546,342, filed Oct. 12, 2011, both of which are incorporated by reference herein in their entirety.

This application is related to U.S. application Ser. No. 13/482,966, filed May 29, 2012, and U.S. application Ser. No. 13/539,050, filed Jun. 29, 2012, both of which are incorporated by reference herein in their entirety.

BACKGROUND

1. Field of Art

The present disclosure generally relates to the field of administrating controlled calls.

2. Background of the Invention

Police officers and other agents "operators" oftentimes conduct investigations during the course of their duties. In many cases, these investigations require the operator administrate a controlled call between two parties. Typically, an operator administrates a controlled call by sitting in with one of the parties to monitor and control a telephone call between the two parties. For example, the operator may work a domestic violence case which hinges on a confession from the offender, or baddie. In order to solicit the confession in a covert manner, the operator may work with a victim in a controlled environment such as a police station or the victim's home. The operator then instructs the victim throughout the course of a call placed to the baddie from the victim's phone. The operator may terminate the call if needed by physically taking the phone of the victim and ending the call or otherwise physically disrupting the line. Typically, the operator will utilize a physical recorder to document the call for evidence. In such instances, the operator will require physical hardware for connecting to the victim's phone, tapping into the victim's phone line, or recording audio when the victim's phone is in a speaker phone setting.

These configurations are less than ideal. Specifically, the physical hardware for connecting to the victim's phone may be cumbersome and have incompatibilities with different phone models or a lengthy setup process. Tapping into the victim's phone line typically requires access to a physical phone line which may be difficult with voice over internet protocol (VoIP) lines and wireless cellular phones. Additionally, the simplest option, putting the baddie on speaker, may tip off the baddie and present difficulties with audio recording quality.

Moreover, operators may not carry the necessary equipment to record a phone call during the course of their usual duties and agencies oftentimes lack the ability to issue every operator the appropriate recording hardware. Accordingly, the recording of the call between the victim and baddie may be delayed from an opportune time of collecting evidence or worse. While these difficulties are discussed with respect to an operator, private individuals (e.g., a business owner) and other entities may face similar difficulties in their respective environments.

SUMMARY

The above and other issues are address by a method and computer system for configuring a virtual number for use on a network and enabling an operator device to administrate (e.g., setup, monitor, and manage recording of) a controlled call between a first and a second contact device with the virtual number. An embodiment of the method comprises receiving authentication information for an operator or operator device in response to a connection request to a virtual number configured for administrating controlled calls. The operator device is authenticated based on the agreement of an authentication number and the virtual number stored in a mapping table and connected with the virtual number. The method further comprises receiving device information corresponding to a first contact device for setting up a controlled call with and transmitting instructions for connecting the first contact device with the virtual number.

The method further comprises receiving device information corresponding to a second contact device for setting up the controlled call with and transmitting instructions for connecting the second connect device with the first contact device using the device information corresponding to the first contact device.

The method further comprises transmitting instructions for passing audio data transmitted between the contact devices to the operator device. The instructions may further disable audio received from the operator device from being transmitted to either contact device.

The method further comprises receiving a command from the operator device to end communications between the first contact device and the second contact device and transmitting instructions for disconnecting the second contact device from the first contact device.

The method further comprises terminating the connection between the second contact device from the first contact device in response to a command from the operator device.

An embodiment of the system comprises a service having one or more processors and a non-transitory computer-readable storage medium storing computer program code. When executed, the computer program code causes the server to receive device information in response to an operator device connecting to a virtual number for administrating controlled calls. The device information includes a first transmitting number corresponding to a first contact device and a second transmitting number corresponding to a second contact device. The server transmits instructions for connecting the first contact device with the virtual number. The server further transmits instructions for connecting the second connect device with the first contact device using the device information corresponding to the first contact device.

The server further transmits instructions for passing audio data transmitted between the contact devices to the operator device. The instructions may further disable audio received from the operator device from being transmitted to either contact device.

The server further transmits instructions for disconnecting the second contact device from the first contact device in response to receiving a command from the operator device to end communications between the first contact device and the second contact device.

The server may receive authentication information for the operator device in response to a request to connect to the virtual number for administrating controlled calls. The server authenticates the operator device for using the virtual number based on the agreement of the authentication information and an authentication number stored in associated with the virtual number in a mapping table.

BRIEF DESCRIPTION OF THE DRAWINGS

The teachings of the embodiments can be readily understood by considering the following detailed description in conjunction with the accompanying drawings.

FIGS. 3B and 3C are tables illustrating example embodiments of virtual number mapping for authenticating operator devices.

FIG. 4 is an interaction diagram illustrating a method for connecting an operator device with a controlled call (CC) number according to one example embodiment.

FIG. 5 is an interaction diagram illustrating a method for setting up a controlled call between two contact devices using a CC number, according to one example embodiment.

DETAILED DESCRIPTION

Figure 1A:
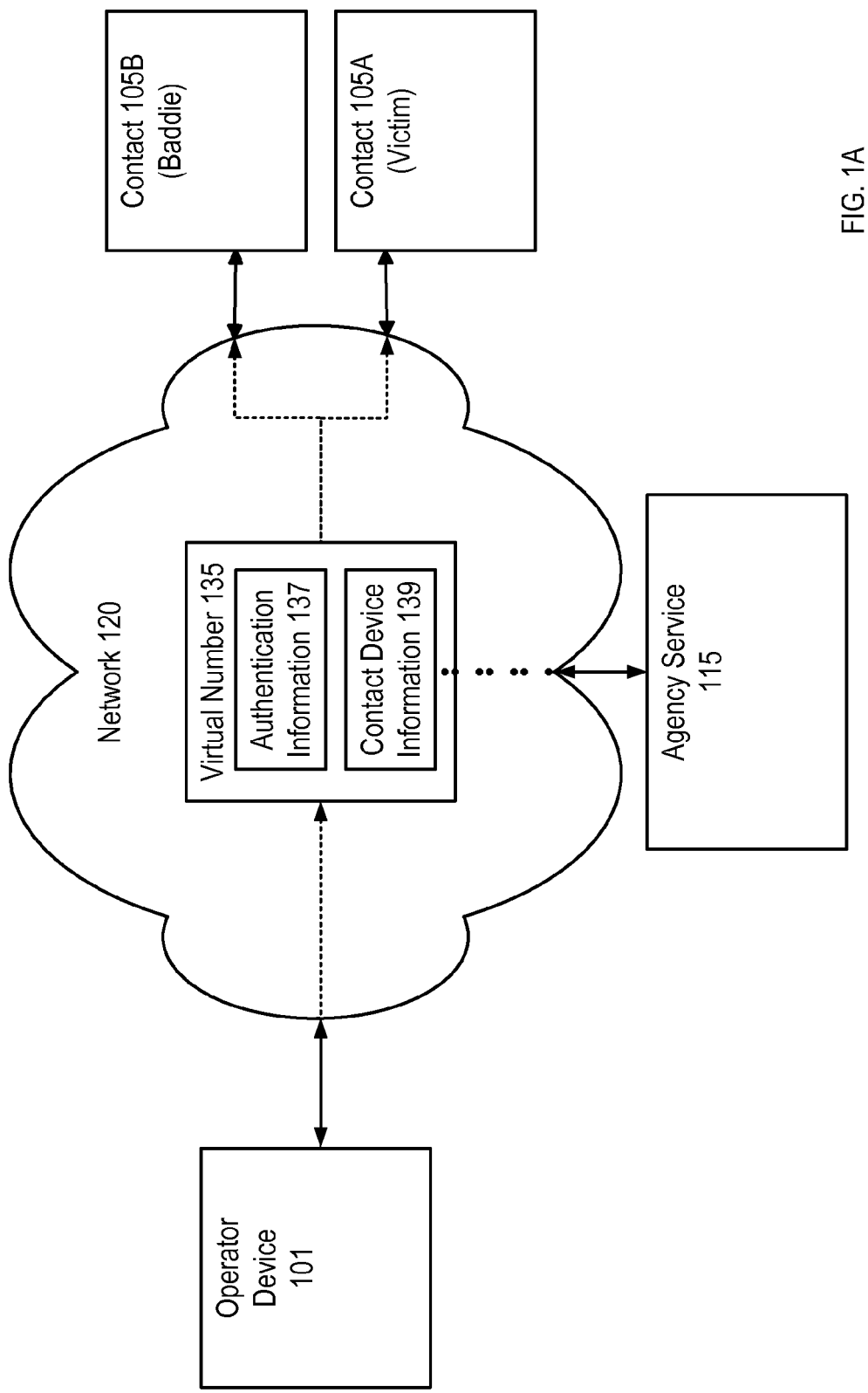
FIG. 1A is a block diagram illustrating an environment for implementing a controlled call system according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

An agency typically supports many operators that work multiple cases. Oftentimes, the traditional procedure of issuing/carrying recording devices and reconfiguring the recording devices for each recorded call between two parties is not feasible under a set of given circumstances or is simply cumbersome to the operator or agency. Additionally, the traditional configurations of the recording devices may tip off a party that the call is being recorded in undercover scenarios and require the operator to manually administrate the controlled call and manage the collection of recorded data and submission of the data to evidence.

Many operators posses a personal mobile phone or are issued a mobile phone by their agency or department which may include a microphone and an application that can substitute as a hand-held digital recorder for recording voice memos and the like. These applications face similar shortcomings as handheld recorders in addition to exposing the operator and agency to potential evidentiary liability. Additionally, while many of these devices also include built-in 3-way calling features, an operator cannot simply utilize a traditional 3-way calling feature to administrate a controlled call between two parties for numerous reasons, some of which include: First, the baddie expects to receive incoming calls from the transmitting number of the victim's phone, not the operator's or a blocked number, which may tip off the baddie. Thus, the victim would need to setup the 3-way call rather than the operator. Secondly, in situations where the victim places the 3-way call, the presence of operator may be detected due to noise on the line (either operator induced, ambient or due to connection quality). Third, in situations where the victim places the 3-way call, the operator is unable to end or otherwise terminate the call. Fourth, the operator still requires a recorder configured to work with their device or the victim's. Finally, if the operator is disconnected during the course of the 3-way call, the recording may be incomplete and thus deficient for evidentiary purposes.

Accordingly, the agency may coordinate with an agency support service for configuring the operator's mobile phone, landline phone, or network-enabled computing device to fulfill the roles of remote setup, management and recording (e.g., evidence collection) for administrating controlled calls. The configuration can take place over-the-air such that a given telephonic device is conveniently enabled to administrate a controlled call as needed. Additionally, if the agency desires to provide the capabilities of controlled calling to multiple operators, the agency can specify multiple phones for configuration or provide authentication information to multiple operators for administrating controlled calls on an as-needed basis.

Example embodiments described herein relate to implementing a controlled call system over a wired (e.g., PSTN and the Internet) and wireless radio network (e.g., PSTN, Cellular Network, and/or WiFi) for network capable devices, such as a mobile phone a land-line phone, VoIP phone, or computer for use with a virtual number for performing a controlled call.

As mobile phones and similar devices are commonly carried by operators during the course of their duties, mobile phones offer an existing platform for administrating controlled calls without dedicated equipment. Additionally, with the popularity of smart phones and feature phones, additional monitoring and safety features may be integrated into the operator's device for enhancing operational viability in the field. For example, the operator device may be configured to collect a wide range of valuable real-time data. Real-time data collected by the operator device may include audio and Global Positioning System ("GPS") coordinates, etc.

The operator device may subsequently transmit all or a portion of the collected real-time data over existing channels (e.g., a network) back to the agency, agency service or another entity. Embodiments of the agency, agency service and/or other entities within the controlled call system receive the collected data for storage and/or live streaming to monitoring devices, operator devices and records. Depending on the embodiment, the monitoring devices are further configured to access and present (e.g., play and/or display) a variety of the real-time and historical data stored on or streamed by the entities on the network. For example, the monitoring devices may access a web interface, API or execute a standalone application for viewing active controlled calls, retrieving audio data from controlled calls, provisioning virtual numbers, modifying assignment of operator devices, and viewing other information associated with controlled calls. In some embodiments, the monitoring devices may access portions of the real-time data via a provided monitoring line configured for maintaining the covertness of the controlled call. Furthermore, other agencies with appropriate credentials and monitoring devices may similarly access portions of the collected information during inter-agency investigations.

Environment and Implementation of the Controlled Call System

FIG. 1A is a block diagram illustrating an environment 100 for implementing a controlled call system according to one example embodiment. As shown the environment 100 includes a network 120 connecting an agency support service provider "agency service" 115, an operator device 101 and contact devices 105A and 105B. While only one agency service 115 and one operator device 101 are shown in FIG. 1A for clarity, embodiments can support many operator devices 101 and have multiple agency service providers 115 for administrating multiple controlled calls.

Agency service 115 represents a collection of compute devices (e.g., servers) and related storage mediums that are configured for performing various activities such as configuring operator devices 101, exchanging data over the network 120 and storing data in support of one or more agencies (not shown) and operated operator devices 101. For example, the agency service 115 may include one or more modules providing ascribed functionality to an agency via an application programming interface ("API") or web interface, collectively "the interface", as described in more detail with reference to FIG. 1B. The agency service 115 may also include infrastructure for providing audio and video communicability (e.g., internally and/or over the network 120) within the monitoring interface using the public switched telephone network ("PSTN"), voice over internet protocol ("VoIP") and video conferencing services.

The operator devices 101 are oftentimes mobile telephonic devices capable of collecting data and transmitting data (e.g., wirelessly) over the network 120. Some examples of an operator device 101 include a mobile phone, tablet or notebook computer. Example embodiments of the operator device 101 as a mobile phone include feature phones, smart phones or standard mobile phones. Accordingly, a given mobile phone or other device operated as an operator device 101 may not necessarily include or support all of the functionality ascribed herein to the operator device or controlled call system due to inherent differences in device capabilities. In some embodiments, other telephonic devices such as land-line phones are used with the controlled call system.

In one embodiment, the operator device 101 executes a CC module for automating the setup of controlled call connections through the network 120 and collecting and transmitting data to entities on the network 120. An example embodiment of a CC module is described in more detail with reference to FIG. 2.

In addition to the operator devices 101, a number of monitoring devices (not shown) may connect to entities on the network 120 to obtain or present data associated with one or more controlled calls administrated by operator devices. Depending on the embodiment, a monitoring device is a network 120 capable device that can be operated within an agency or externally in the field. As referred to herein, a monitoring device is a mobile or stationary device capable of connectivity (e.g., wireless or wired) to a network 120 such as an agency network, the internet, PSTN and/or cellular network. Some examples of a monitoring device include a mobile phone, land-line phone, tablet and notebook or desktop computer.

Example embodiments of the monitoring device as a mobile phone can include feature phones, smart phones or standard mobile phones. Accordingly, a given mobile phone or other device operated as a monitoring device does not necessarily include or support all of the functionality ascribed herein to the monitoring device or the controlled call system due to inherent differences in device capabilities. In one example embodiment, the monitoring device executes a monitoring module for interfacing with entities on the network 120 to manage operator devices 101 and view collected data.

Also shown are two contact devices 105 associated with the parties the operator desires to administrate a controlled call between. Embodiments of the various contact devices 105 include any network 120 capable device that may send or receive information associated with a transmitting number on the network 120 (however, in some instances, the contact device 105 may use a virtual number itself, or other means, to do so). Accordingly, as referred to herein, a contact device 105 can be a mobile or stationary device capable of connectivity (e.g., wireless or wired) to the network 120 for sending or receiving information over the internet, PSTN and/or cellular network. Some examples of a contact device 105 include a mobile phone, land-line phone, tablet and notebook or desktop computer capable of receiving an incoming call.

FIG. 1A also illustrates a virtual number 135 configured for use on the network 120. In one embodiment, the agency service 115 provisions and configures the virtual numbers 135 and handles number information to establish identities for the virtual numbers on the network 120. Additionally, the agency service 115 receives authentication information 137 from operator devices 101 connecting to the virtual numbers 135 for administrating controlled calls. Some examples of authentication information 137 include a transmitting number of an authorized operator device 101 and/or a PIN number associated with the virtual number 135. For example, an operator device 101 may request (and attempt) to communicate with virtual number 135 by way of a connection request or otherwise transmitting data to the virtual number such as by placing a call to the virtual number from the operator device. Based on the authentication information 137 received from the operator device 101, and configuration of the virtual number, the agency service 115 authenticates the operator device 101 for using the virtual number to administrate a controlled call. For example, the agency service 115 may maintain a mapping table storing authentication numbers such as operator device transmitting numbers and/or PINs in association with virtual numbers 135. The agency service 115 accesses the mapping table for authenticating operator devices 101 requesting to connect to virtual numbers based on received authentication information 137.

After authenticating the operator device 101, the agency service 115 enables the operator to specify a contact 105A to initiate the controlled call with, using the operator device. Typically, in a controlled call setting, the contact 105A (e.g., a victim) the operator specifies to initiate the controlled call with is aware that the operator will be administrating and overhearing the call. In turn, the agency service 115 may enable the operator device 101 to communicate with the victim's contact device 105A through (e.g., establishing a connection with or transmitting data from) the virtual number 135. For example, the operator device 101 specifies contact device information 139, such as a transmitting number, for the contact device 105A. The agency service 115 receives the contact device information 139 for the victim's device 105A and transmits instructions that cause the contact device 105A to receive a connection request from virtual number 135. If the contact device 105A answers, the victim and operator are connected. In other words, the agency service 115 transmits instructions (e.g., to a provider) to dial out to the contact device 105A from the virtual number 135A to connect the operator device 101 with the contact device 105A. As the agency service 115 connects the operator device 101 with entities on the network 120 through the virtual number, the virtual numbers 135 prevent other entities, such as contacts 105, from viewing device and/or number information associated with the operator device. In some embodiments, voice communications are enabled between the contact device 105A and the operator device 101 such that the operator may instruct or coach the victim personally or play a recorded message to the victim about the controlled call process.

Once the contact device 105A is connected to the virtual number 135, the agency service 115 enables the operator to specify a contact 105B which contact 105A will be communicating with during the controlled call. Typically, in a controlled call setting, the contact 105B (e.g., a baddie) the operator specifies for the contact 105A to communicate with is unaware of the operator's presence and control over the call. For example, the operator device 101 specifies contact device information 139, such as a transmitting number, for the contact device 105B. The agency service 115 receives the contact device information 139 for the baddie's device 105B and transmits instructions that cause the contact device 105B to receive a connection request, which appears to originate from the contact device 105A of the victim. If the contact device 105B answers, the victim, baddie and operator are connected. In other words, the agency service 115 transmits instructions (e.g., to a provider) to dial out to the contact device 105B using the transmitting number of the contact device 105A and connects contact device 105A with contact device 105B while allowing the operator device 101 to remain connected (and in control of the line) unbeknownst to the baddie.

In some embodiments, voice communications from the operator device 101 are disabled once the contact devices 105A, 105B are connected such that the baddie is not tipped off to the controlled call. Additionally, as the provider 127 forges one or more of the connections between the contact devices 105A, 105B and the network 120 through the virtual number 135, the agency service 115 may configure the virtual number 135 at the provider 127 or transmit instructions to the provider such that the operator device 101 possesses administrative privileges over the communication channel. Thus, for example, the operator may terminate the communication channel between the contacts 105A, 105B or otherwise manage the controlled call.

The network 120 represents the communication pathway between agencies, agency service 115, the operator devices 101, contact devices 105, monitoring devices 107 and other entities (not shown). In one embodiment, the network 120 includes standard communications technologies and/or protocols and can include the Internet and PSTN. Oftentimes, these communications technologies and/or protocols carry both PSTN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

Figure 1B:
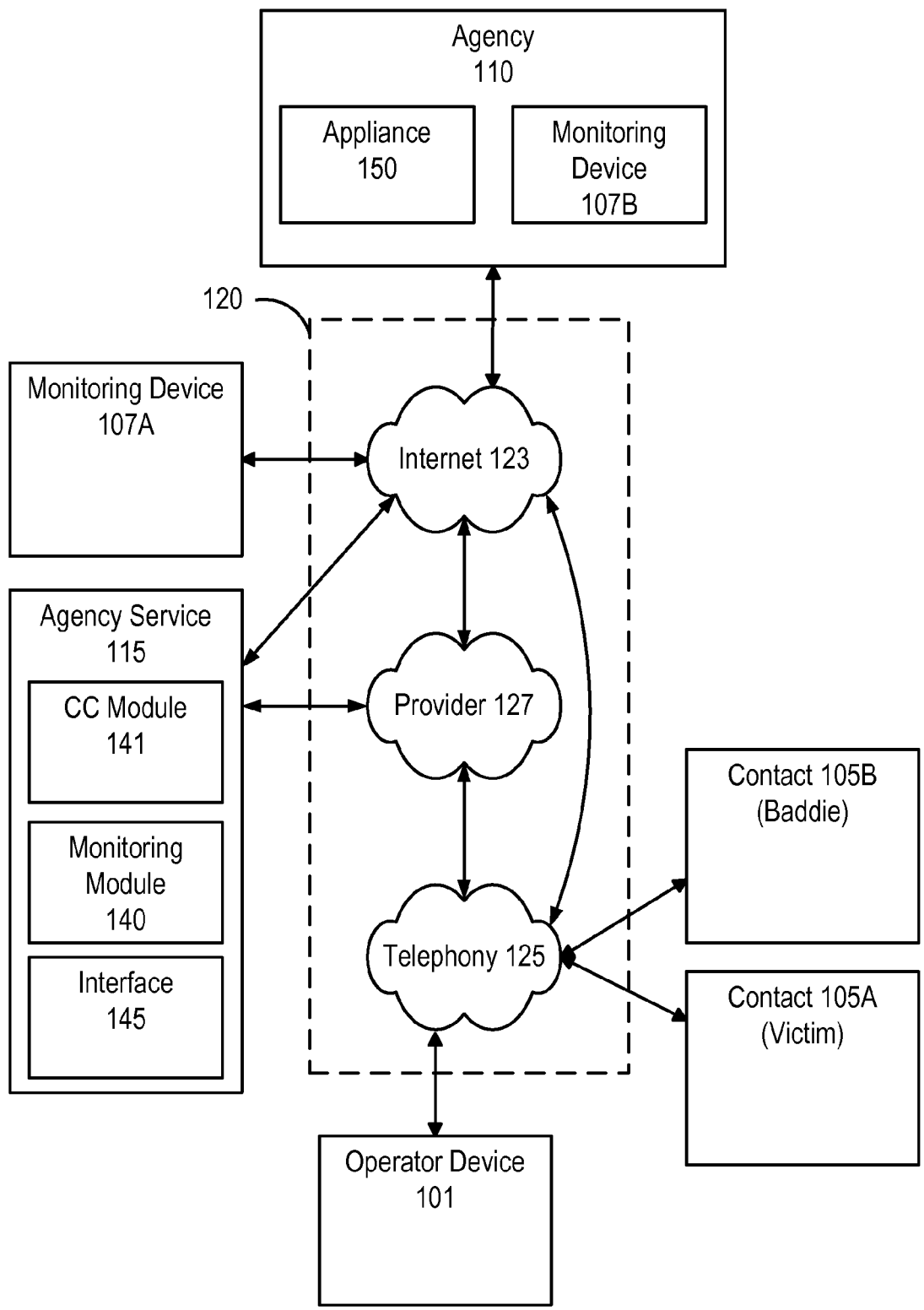
FIG. 1B is a block diagram illustrating an operating environment of an agency service providing a controlled call service according to one example embodiment.

FIG. 1B is a block diagram illustrating an operating environment of an agency service 115 providing a controlled call system according to one example embodiment. As shown, the operating environment includes an agency 110, monitoring devices 107, operator devices 101, contacts 105 and a network 120 with components such as the internet 123, telephony 125 and provider 127. The network 120 may also include GPS satellites (not shown) that relay position data to operator devices 101 and other devices.

Agency 110 represents a collection of servers, desktop, notebook or tablet computers, mobile telephones and related storage mediums used by respective agency personnel for executing applications or modules to communicate with and receive data from the agency service 115 (e.g., via the interface 145) and other entities on the network 120. For example, agency 110 devices may execute a web browser to access a web interface or execute a mobile or desktop application for communicating with an API provided by the agency service 115. An agency 110 may also include telephonic and video infrastructure enabling audio and video communicability (e.g., internally and/or over the network 120) using the public switched telephone network ("PTSN"), voice over internet protocol ("VoIP") and video conferencing services for monitoring or specifying configurations for operator devices 101.

The telephony network 125 may include servers, switches and other hardware and software for implementing, among other protocols and technologies, worldwide interoperability for PSTN communications including land-lines and 2G/3G/4G wireless protocols. The telephony network 125 also provides mobile devices with the capability to transmit and receive data over the internet 123. The telephony network 125 is managed by one or more communication service providers "CSPs" (not shown) that own telephone numbers for use on the PSTN and the CSPs own network (e.g., a wireless network that communicates with the PSTN).

The provider 127 may include servers, switches and other hardware and software for communicating over the network 120 with CSPs and other entities. The provider 127 buys or leases numbers for use on the telephony network 125 from multiple CSPs. The provider 127, in turn, manages numbers provisioned for use by the agency service 115 and the telephony traffic associated with the numbers. In one embodiment, the provider 127 allows the agency service 115 to provision one or more of the numbers as virtual numbers over the network 120.

Typically, a number used on the telephony 125 network directs to a given mobile device, VoIP device or land-line device having an associated number identity characterized by automatic number identification "ANI" information, or caller identification. Virtual numbers, while still operable with the PSTN and CSP networks, are associated with the provider 127 who handles telephony traffic for the number. Because a virtual number does not direct to an end user device, the provider 127 may establish connections using the virtual number with devices dialing, dialed, or otherwise identified based on instructions or configuration information received from the agency service 115, agency 110, operator device 101, and/or monitoring device 107. Additionally, the provider 127 may record controlled call information such as call audio and caller history (e.g., on a computer readable medium) and stream/provide call information for download (e.g., over the network 120).

The provider 127 may also pass/bridge audio (bidirectional or unidirectional) in real-time between two or more telephonic devices with virtual numbers (or connected by the provider 127 via a virtual number). Additionally, as the virtual numbers are handled by the provider 127, the agency service 115 may modify ANI information and caller identification associated with the virtual number. The provider 127 may also receive instructions to present a set of ANI information and caller identification information (e.g., a spoofed number identity) from one contact device (e.g., that of the victim's) to another (e.g., that of the baddie) when connecting devices via virtual numbers.

In addition to provisioning virtual numbers for the agency service 115, the provider 127 communicates notifications and data associated with the virtual numbers to the agency service 115 or other entity such as the agency 110. For example, the provider 127 may notify the agency service 115 (and optionally a monitoring device 107) when an operator device 101 uses a virtual number to administrate a controlled call or upon completion of a controlled call. The provider 127 may also receive instructions (e.g., during the call from the operator device 101) to stop/start recordings of controlled calls on the virtual number and interface with a transcription service to transcribe call audio. In turn, the provider 127 can transmit the recordings and transcripts to the agency service 115 or other entity on the network 120.

Additionally, the provider 127 may enable or disable inbound and/or outbound audio for different parties connected to a virtual number and recordings thereof responsive to instructions received (e.g., via an API) from the agency service 115 or operator device 101. The provider 127 may receive instructions for configuring and managing a virtual number as part of the provisioning process, prior to an incoming call, in real-time when connecting parties using the virtual number and during controlled calls. In some embodiments, the provider 127 communicates directly with the agency 110, operating device 101 and/or monitoring device 107 to provision virtual numbers, transmit notifications and data or receive instructions. Additionally, the provider 127 itself may function as a CSP and vice versa.

The agency service 115 receives requests for provisioning and mapping virtual number from the agency 110, operator device 101, or monitoring device 107. The requests can include number information for provisioning virtual numbers such as an area code (e.g., 555), country code (e.g., +44) and/or associated CSP. In turn, the agency service 115 queries the provider 127 for available virtual numbers matching the request and returns the matching virtual numbers to the requesting entity. The agency service 115 subsequently receives a selection of virtual numbers from the requesting entity and claims the virtual numbers from the provider 127. The agency service 115 may optionally allow the entity to specify number information such as ANI and/or caller identification associated with the virtual number to spoof the number's identity on the network 120. The agency service 115, in turn, transmits instructions to the provider 127 for modifying the number identity. The agency service 115 may optionally verify the spoofed number identity. When a virtual number is no longer needed by the agency 110A, the agency service 115 releases the number back to the provider 127.

The requests can also include mapping information for configuring claimed virtual number function in a mapping table. Depending on the desired configuration, the mapping information may include the transmitting number and/or a PIN for authenticating operator devices 101 requesting to administrate a controlled call and/or specify the function of the virtual number (e.g., for administrating controlled calls). One example mapping request may specify a claimed virtual number for use as a controlled call (CC) number that operator devices 101 connects to in order to administrate a controlled call over the telephony 125 network between two contacts 105A, 105B. In one embodiment, the request includes the transmitting numbers of operator devices 101 allowed to use the virtual number for controlled calls. Alternatively, the request may include a PIN that operators may enter on any device connecting to the virtual number to authenticate the device as an operator device 101. In response to the request, the agency service 115 associates the transmitting numbers or PIN with the virtual number and stores the association in a mapping table.

In practice, agency service 115 consults the mapping table to automatically identify a device connecting to a virtual number as the operator device 101 (an optionally monitoring devices 107) based on the device's transmitting number. Thus, for example, an operator of an operator device 101 may simply dial the CC number mapped to the transmitting number of his phone to administrate a controlled call.

In some embodiments, personnel with a monitoring device 107 may be enabled to listen in on the controlled call in real-time with a mobile or land-line phone at the agency 110A or in the field by having the transmitting number of their devices or a separate PIN associated with the CC number. Accordingly, the monitoring device 107 may be authenticated based on its transmitting number or an entered PIN and receive controlled call audio via the CC number.

Additionally, embodiments of the agency service 115 can use the mapping of monitoring devices 107 for instructing the provider 127 to automatically dial (e.g., from a specified virtual number) or otherwise notify (e.g., a SMS text message or email) monitoring devices when a controlled call is being administrated on a given CC number. The agency service 115 may also notify monitoring devices 107 through the interface 145 or via email.

To prohibit unauthorized access to controlled calling numbers, the agency service 115 may allow personnel and operators to specify key-ins when provisioning and/or mapping virtual numbers. The agency service 115 stores the key-ins in the mapping table or other suitable database structure to identify and authenticate callers attempting connections to the virtual numbers responsive to correct key-ins. Depending on the embodiment, the agency 110, agency service 115 or provider 127 may store the mapping table and/or key-ins for device identification and authentication.

In some embodiments, the agency service 115 may instruct the provider 127 to prompt (e.g., "Press 2 to make a controlled call") the operator after connecting to the CC number to indicate whether the operator desires to make a controlled call. In another example, the agency service 115 may prompt the operator to make a selection for administrating a controlled call via a user interface (i.e., an interface provided by the CC module 141) on a cell phone or other device. Additionally, the agency service 115 may prompt an operator to record a preempt message for documenting the purpose of the controlled call. For example, the operator may speak into the operator device 101 after a prompt from the provider 127 or select an option to record a preempt via the interface of the CC module 141. Received preempts may be stored locally by the provider 127 and/or transmitted to the agency service 115 and appliance 150. The agency service 115 may similarly instruct the provider 127 to prompt the operator for contact device information 139 about the different contact devices 105.

In some embodiments, the agency service 115 queries one or more third party databases for the Caller ID information corresponding to one or more of the contacts 105. The agency service 115 may use the Caller ID information to verify the validity of contact device information 139 provided by the operator device 101 and/or for instructing the provider 127 to use a given number identity (e.g., that of the victim's device 105A) for dialing out to a contact. For example, the agency service 115 may instruct the provider 127 to the contact device 105B of the baddie using number information from the contact device 105A of the victim.

In some embodiments, the agency service 115 provides a controlled call (CC) module 141 to the operator device 101. The CC module 141 interfaces with the native dialer of the operator device 101 to automate the connection process to a CC number and setup of the controlled call with the contact devices. Additionally, the CC module 141 may interface with operator device 101 software and/or hardware to utilize features such as a GPS device to collect real-time position data and/or a microphone to collect audio data. The CC module 141 transmits the collected data over the network 120 back to the agency service 115 or other entity. The agency service 115, in turn, may store the collected data for transmission to one or more monitoring devices 107 and the agency 110. The CC module 141 is described in more detail with reference to FIG. 2.

In some embodiments, the agency service 115 includes an interface 145 for providing data received from operator devices 101 and controlled call audio between the contacts 105 to various monitoring devices 107 and/or appliances 150 over the network 120. For example, the interface 145 may provide monitoring devices 107 and the appliance 150 with data corresponding to the status of one or more controlled calling numbers (e.g., in use, complete, call history, etc.) and contact device 105 information. If a controlled calling number is in use and the operator device 101 is transmitting real-time, the interface 145 may stream data such as audio received from the provider 127 during the active transmission, GPS coordinates of the operating device, and the internet protocol address, telephone numbers, and/or PINs identifying the operator device and the contact devices 105. In some embodiments, the interface 145 syncs collected data prior to transmission or includes tags in the transmitted data for synchronization of playback at the monitoring device 107 or operator device 101. The interface 145 can also stream, or provide for download, data from completed controlled call recordings.

In some embodiments, the agency service 115 provides a monitoring module 140 to monitoring devices 107 for accessing the interface 145. The monitoring module 140 transmits requests associated with configuring operator devices 101 and virtual numbers and receiving real-time and historic data for controlled calls. For example, the monitoring module 140 may provide a user interface or status dashboard with options for provisioning virtual numbers, mapping a transmitting number to a given virtual number and assigning PINs for authenticating connections to the virtual number. Additionally, the monitoring module 140 may provide a user interface for identifying a virtual number as a CC number in the mapping table. In one embodiment, the dashboard provides an option to toggle recording of a controlled call on or off with the agency service 115. When the recording session is disabled, the monitoring device 107 still receives real-time data, but the agency service 115, appliance 150 and provider 127 do not store copies of the collected data.

The monitoring module 140 may also display real-time status information for the operator device 101 including current GPS location, tracked GPS location, live audio, mapping table information and other information collected from the operator device and streamed by the interface 145. Similarly, the monitoring module 140 may be used to access and playback historic activity associated with a given virtual number or operator device 101. For example, the monitoring module 140 may download files associated with an administrated controlled call for playback or stream them. In addition to interfacing with the agency service 115, the monitoring module 140 may interface with an appliance 150 that stores (or backs up) collected data within the agency 110. In some embodiments, the monitoring module 140 may include functionality of the CC module 141 and vice versa.

In one embodiment, the agency 110 includes an appliance 150 for storing data collected by operator devices 101 and controlled call information and audio. The appliance 150 may utilize the monitoring interface 145 provided by the agency service 115 for updating stored data or receive data directly from operator devices 101. Additionally, the appliance 150 may receive audio recorded during the controlled call and any associated transcripts of the audio from the provider 127 or agency service 115. One example embodiment of the appliance 150 also includes its own interface (not shown) that enables monitoring devices 107 and operator device to access real-time and historic data stored on the appliance for administered controlled calls. Interfaces provided by the agency service 115 or appliance 150 may also be accessible via a web browser for streaming or downloading data and include the same or similar options.

Additionally, the appliance 150 and agency service 115 may communicate to intermittently update collected data and records at defined intervals or in response to notifications to download data. During the intervals or notification periods, the agency service 115 may process the data and perform any necessary actions as desired by operator devices 101 or monitoring device 107 until the data is transferred to the appliance 150. In some embodiments, the agency service 115 maintains a persistent connection with the appliance 150 to facilitate transfer of real-time data collected by operator devices 101 operated in the field.

In one embodiment, the agency service 115 insures that it, and the provider 127, do not store data collected by operator devices 101 or from a virtual number beyond the time needed to facilitate transfer. However, in mission critical situations, operators and other agency 110 personnel cannot rely only on the availability of the appliance 150 for storing and maintaining collected data. Consequently, if the appliance 150 is unable to take possession of the collected data or goes offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains a database (not shown) storing hashes (e.g., MD5, SHA, etc.) that uniquely identify evidentiary files transmitted to the appliance 150. In the context of criminal investigations, the stored hash may serve to prove that recordings and other data on the appliance 150 have not been tampered with or compromised.

In some embodiments, the agency service 115 maintains an appliance instead of, or in addition to, the agency 110. In such cases, the appliance may exist as a dedicated piece of hardware or remote storage. Alternatively, embodiments of the appliance 150 may be implemented in a cloud computing and storage stack available on the network 120.

Operator Device Functionality

Figure 2:
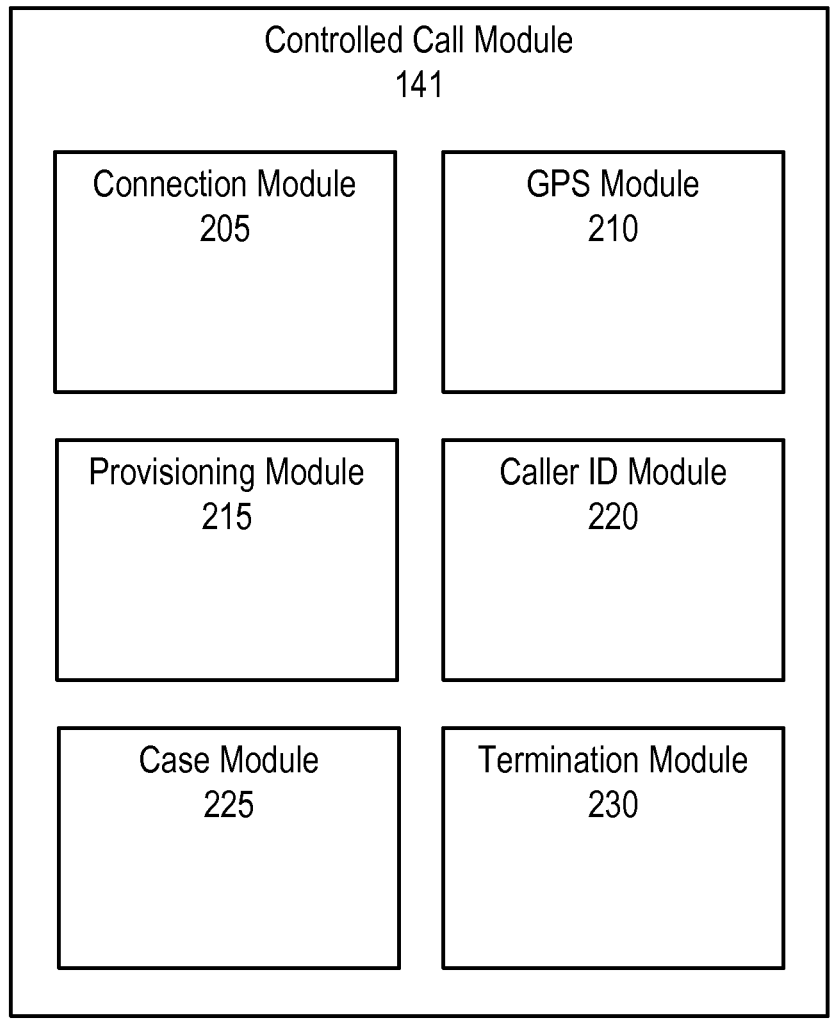
FIG. 2 is a block diagram illustrating a controlled call (CC) module according to one example embodiment.

FIG. 2 is a block diagram illustrating a controlled call module 141 according to one example embodiment. As mentioned above, the CC module 141 may be downloaded from the agency service 115 to the operator device 101. For example, the CC module 141 or its functionality may be incorporated in an application executable by the operator device 101. In turn, the operator device 101 may execute the CC module 141 (or application) to facilitate the controlled calling process and transmitting of collected data to entities on the network 120.

As shown in FIG. 2, the CC module 141 itself includes multiple modules. In the embodiment shown in FIG. 2, the CC module 141 includes a connection module 205, GPS module 210, provisioning module 215, caller ID module 220, case module 225 and termination module 230. In some embodiments, the functions are distributed among the modules in a different manner than described herein. Other embodiments have additional and/or other modules.

The connection module 205 automates the connection process for dialing out to a virtual number and transmitting of device information 139 for the contact devices 105 of the victim and baddie. The connection module 205 receives input (e.g., via a user interface) from the operator including a CC number, a first transmitting number of a contact device 105A (e.g., that of the victim) that will be aware the call is controlled, and a second transmitting number of a contact device 105B that may be unaware the call is controlled.

In some embodiments, the connection module 205 further receives authentication information 137 such as a PIN associated with the operator device 101 or the CC number. The connection module 205 transmits the authentication information 137 to the provider 127 and/or agency service 115 when connecting to the CC number for authentication of the operator device 101.

Once a connection between the operator device 101 and the CC number is established, the connection module 205 transmits the device information 139 corresponding to the contact devices 105 which the operator desires to setup the controlled call with over the network 120. The connection module 205 may transmit the device information 139 for the contact devices 105 all at once or as needed during the controlled call process.

In some embodiments, the connection module 205 may include an option in a user interface for the operator to indicate whether he desires to record a preempt message. The connection module 205 may also enable the operator to record the preempt message prior to dialing out to the CC number. The connection module 205 may transmit the recorded preempt message to the provider 127, agency service 115, or appliance 150. The connection module 205 may also include an option in the user interface for the operator to indicate which portions of the controlled call should be recorded. For example, the operator may not desire to record any instruction provided to the victim in evidence but require the conversation between the victim and baddie recorded.

Further, embodiments of the connection module 205 may also include options in the user interface for the operator to indicate when they desire to proceed to a next phase of the controlled call. For example, the operator may indicate in the interface when they desire to contact the victim to provide instructions and later indicate when the victim is ready for the monitored portion of the controlled call with the baddie. These options may also be available through key-in commands using the native dialer. In some embodiments, the connection module 205 interfaces with the native dialer to transmit one or more commands or data when connected to the network 120.

The GPS module 210 communicates with a native GPS receiver on the operator device 101 to receive GPS location data. The GPS module 210 may also communicate with other radio receivers and directional mechanisms (e.g., compass or accelerometers) on the operator device 101 to receive additional location data. The GPS module 210 processes the GPS and radio location data to determine and refine an estimated location measurement for the operator device 101. The location measurement may include, but is not limited to, a latitude, longitude, altitude, heading, speed, associated accuracy measurement and the time and date of recording. The GPS module 210 transmits the determined location measurement over the network 120 the agency service 115 or other entity. In one embodiment, the GPS module 210 streams the location measurement in real-time.

The provisioning module 215 interfaces with the provider 127 or agency services 115 to provision virtual numbers and modify virtual number assignments and configuration in the field. Alternatively, a web browser on the operator device 101 may be used. For example, the web browser or provisioning module 215 may present the operator with a list of all virtual numbers associated with a given account with the agency service 115. Through the interface, the operator may provision and modify mapping and configure the virtual numbers as CC numbers.

The caller ID module 220 interfaces with the provider 127 or agency services 115 to modify caller ID or other number information associated with provisioned virtual numbers. For example, the caller ID module 220 presents an interface to the operator to specify number information such as location, ownership, carrier and whether or not any of the information should be restricted or blocked when dialing out (e.g., to the contact device 105A of the victim) from a given CC number.

In some embodiments, the case module 225 interfaces with the provider 127, agency services 115 or appliance 150 to retrieve activities associated with a given CC number or case number which one or more controlled calls are associated with. For example, the case module 225 presents an interface with CC numbers or case numbers that the operator may select, for example, to view associated controlled call activity. The case module 225 may further provide an interface for the operator to associate contact information (e.g., that of the victim and baddie) or other information (e.g., address book entries) with a given CC number or case number. The case module 225 may store the address book entries locally and/or remotely with the agency services 115 or appliance 150.

Additionally, the case module 225 may retrieve activities associated with a given transmitting number of an operator device 101 used to administrate one or more controlled calls. For example, the case module 225 may transmit the transmitting number of the operator device 101 executing the case module 225 or other PIN information provided by the operator to the agency service 115 or appliance 150 to retrieve information about controlled calls administrated with the device or by the operator.

The termination module 230 provides an interface including a number of call commands to the operator when the controlled call is taking place between the victim and baddie. Call commands may include, but are not limed to: disconnecting the victim or baddie, terminating the connections of all parties, and stopping or starting recordings of the controlled call. In response to the selection of a call command by the operator, the terminal module 230 transmits the selection/command to the provider 127 and/or agency service 115. In turn, the provider 127 (e.g., directly or in response to instructions from the agency service 115) performs the desired action.

In some embodiments, selections within the interface of the termination module 230 are transmitted in the form of key-ins or with actions used during a typical call. For example, in response to a selection to terminate the connection of all parties, the termination module 230 may end or hang-up the call through the native dialer. Alternatively, the termination module 230 may transmit one or more key-in selections (such as the * or #) to indicate the operator's command selection within the user interface. The key-in selections may be interpreted at the provider 127 and/or agency service to perform the desired action. Furthermore, actions identified by the provider 127 or agency service 115 from key-in selections may be transmitted using the native dialer of the operator device 101 without use of the CC module 141. Commands that may be transmitted using the native dialer may be available to all operator devices 101, including those that are not executing a CC module 141.

In some embodiments, the CC module 141 and the modules therein interface and communicate with non-native devices attached to the operator device 101. For example, audio and location data can be determined from accessories coupled (e.g., wired microphone) or wirelessly connected (e.g., Bluetooth headset) to the operator device 101.

Additionally, some or all of the features provided by the CC module 141 may require the operator to enter a specified key-in (e.g., button press combination, password or other personal identification) prior to operation or launch.

Virtual Number Provisioning

Figure 3A:
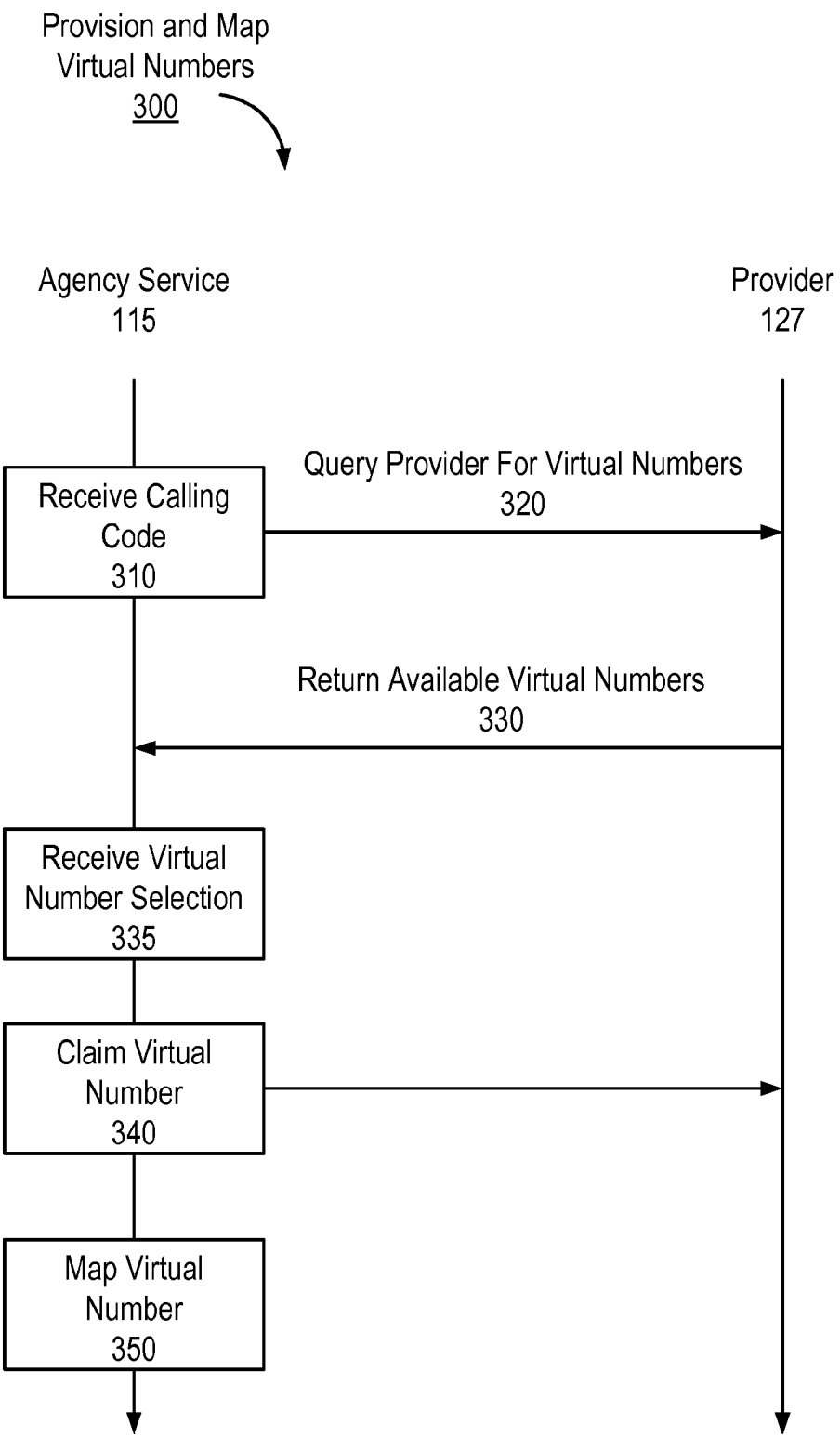
FIG. 3A is an interaction diagram illustrating a method for provisioning and mapping virtual numbers for enabling an operator device to administrate controlled calls on virtual numbers according to one example embodiment.

FIG. 3A is an interaction diagram illustrating a method for provisioning and mapping 300 virtual numbers for enabling an operator device 101 to manage controlled calls on virtual numbers according to one example embodiment. Initially, the agency service 115 receives 310 a request including a calling code for provisioning 300 a virtual number from a monitoring device 107, operator device 101, provided web interface or other entity. The calling code can include an area code and country code where the provisioned virtual number will be operated.

The agency service 115 queries 320 the provider for virtual numbers matching the specified calling code. The provider 127 returns 330 a list of available virtual numbers to the agency service 115 which, in turn, transmits the virtual numbers for display to the requestor. The agency service 115 receives 335 one or more virtual number selections and claims 340 each selected virtual number from the provider 127. The agency service 115 may optionally include corresponding ANI and caller identification information for a virtual number that may be edited on the requesting device 101, 107 or in the web interface. The agency service 115 subsequently stores the modified virtual number information and instructs the provider 127 to update the associated virtual number information.

With one or more virtual numbers claimed, the agency service 115 can receive mapping requests for the virtual numbers and, in turn, map 350 the virtual numbers responsive to information in the mapping request. For example, the requestor may be prompted to enter the transmitting number of an operator device 101 for association with a virtual number to be used as a CC number. The agency service 115 stores the transmitting number of the operator device 101 and the CC number in a mapping table (e.g., at the agency service 115 or on the appliance 150). The requestor may modify the mapping at any time, without any interruption of service at the receiving number. The requestor may also be prompted to enter a PIN for associated with a virtual number to be used as a CC number. In such cases, the PIN number may be stored instead of, or in addition to, the transmitting number of an operator device 101.

When an operator device 101 subsequently dials a CC number, the agency service 115 authenticates operator device responsive to the transmitting number associated with the CC number. The agency service 115 may further identify the operator device 101 from the mapping table responsive to a PIN provided by the operator. In turn, the agency service 115 instructs the provider 127 to connect the operator device 101 to the CC number and provides any additional configuration instructions for the CC number during the controlled calling process. A requestor may re-specify the mapping configuration as needed to change or swap transmitting numbers and PINs associated with CC numbers.

Example embodiments of monitoring device 107 mapping to virtual numbers for monitoring controlled calls may be performed in the same or similar fashion as operator device 101 mappings.

FIG. 3B is a table illustrating an example embodiment of virtual number mapping 350 with transmitting numbers 361A for authenticating operator devices 101. As shown, mapping table 360A includes a number of CC numbers 363 mapped to corresponding transmitting numbers 361A (e.g., of operator device 101).

When the agency service 115 receives connection requests to CC numbers 363 from the network 120, the agency service authenticates the connecting device as the operator device 101 based on the transmitting number 361A stored in the mapping table 360A. In turn, the agency service 115 or provider 127 receives connection information for the victim from the operator device 101 and dials the corresponding contact 105A from the CC number 363.

Prior to permitting the operator device 101 to administrate a controlled call using the CC number, the agency service 115 may wait or instruct the provider 127 to wait for key-in of a specified password.

FIG. 3C is a table illustrating an example embodiment of virtual number mapping 350 with a PIN 361B for authenticating operator devices 101. As shown, mapping table 360B includes a number of CC numbers 363 mapped to corresponding PINs 361B. PINs may provide an extra layer of security for authenticating or identifying a specific operator once the operator device 101 is connected to the virtual number.

Additionally, if a connecting device's number does not match a transmitting number 361A stored (if any) for the CC number, the agency service 115 may instruct the provider 127 to connect the operator device 101 and prompt for a PIN 361B associated with the CC number 363. Thus, for example, rather than mapping multiple transmitting numbers 361A to allow multiple operators to use a CC number 363, each operator may use a same PIN 361B to administrate controlled calls with the CC number. In one embodiment, the operator must enter the PIN or key-in to enter a PIN (e.g., hitting * or # prior to entering the PIN) within a given time period (e.g., 2-5 seconds) to avoid being disconnected.

Similar precautions may be implemented to authenticate monitoring devices 107 that desire to monitor administrated controlled calls. In some embodiments, the mapping tables 360 further include mappings of monitoring device 107 transmitting numbers or separate PINs to explicitly identify monitoring personnel and devices.

Administrating a Controlled Call

FIG. 4 is an interaction diagram illustrating a method for connecting 400 an operator device with a CC number according to one example embodiment. Once the agency service 115 provisions 300 a virtual number with the provider 127, an operator device 101 may connect 400 to the virtual number.

For any device dialing 410 the virtual number, the provider 127 receives the connection request via the telephony network 125 and identifies 420 the dialed CC number as a virtual number provisioned 300 by agency service 115. Accordingly, in embodiments where the agency service 115 stores the mapping table, the provider 127 passes authentication information including the transmitting number of the device and the virtual number to the agency service 115.

The agency service 115, in turn, authenticates 430 the device attempting to connect to the virtual number as an operator device 101 based on agreement of the authentication information with the mapping of the transmitting number and the CC number stored in the mapping table. The agency service 115, in turn, instructs the provider 127 to connect 440 the operator device 101 and provides instructions that enable the operator device 101 to setup 500 a controlled call. Example embodiments of setting up the controlled call 500 are explained in more detail with reference to FIG. 5.

In some embodiments, the operator device 101 may provide additional authentication information to the provider and/or agency service 115 such as a PIN for authenticating 430 use of a CC number stored in associated with the PIN in the mapping table. For example, an agency 110 may want to enable the option to use unmapped devices as operator devices 101 on a specified CC number. The agency service 115 may instruct the provider 127 to play a generic tone, number not available recording or explicit instructions to notify operators that they need to key-in a PIN. Depending on the embodiment, the operator device 101 may provide the PIN prior to, or subsequent to, the agency service 115 instructing the provider 127 to connect 440 the operator device 101.

FIG. 5 is an interaction diagram illustrating a method for setting up a controlled call between two contact devices 105 with an operator device 101 using a CC number, according to one example embodiment. Once the connection 400 between the operator device 101 and the CC number is established, the operator may enter the transmitting number of a first contact device 105A (e.g., that of the victim) and a second contact device 105B (e.g., that of the baddie). Alternatively, the numbers of the contact devices 105 may have been previous entered in an application. In either instance, the operator device 101 transmits 510 collected contact device information to the provider 127. The provider 127 may transmit the contact device information to the agency service 115 or acknowledge receipt of the information for records keeping, verification or to open a new record. In some embodiments, the agency service 115 verifies whether the transmitting numbers of the contact devices 105 are valid before instructing the provider 127 to dial out to a contact.

Based on instructions provided 513 by the agency service 115 and the contact information, the provider 127 dials out 515 to the specified transmitting number of the victim's contact device 105A from the CC number. Thus, when the victim receives the connection request on their contact device 105A, the call appears to be coming from the CC number. Accordingly, the contact device 105A will display number information (if any, e.g., for blocked or restricted number) for the CC number rather than the operator device 101. If the contact device 105A picks up, the provider 127 establishes 520 a connection between the operator device 101 and the contact device 105 (e.g., through the CC number, or directly as the contact device 105A will not receive additional number or device information from the operator device).

Once the connection 520 between the operator device 101 and the contact device 105 is established, the provider 127 may optionally enable audio communications between two devices. The operator device 101 collects audio data using a microphone coupled to the operator device. The operator device 101, in turn, transmits the collected audio data to the provider 127 and contact device 105A by way of the connection 400 through the CC number. The contact devices 105 may communicate audio data over the network 120 in a similar fashion.

With audio communication enabled between the victim and operator, the operator may optionally instruct 521 the victim about the controlled call process before the connection between the victim's contact device 105A and the baddie's contact device 105B is established. The operator may indicate (e.g., to the agency service 115 and/or provider 127) via interface selections provided by the CC module 141 or via key-in commands with the native dialer for the provider 127 to record (or store) or discard the instruction 521 portion of the call for evidence. The operator may provide the selection before, during, or after instructing 521 the victim. Alternatively, the provider 127 may play a predefined message or audio recorded by the operator device 101 for instructing the victim about the controlled call process prior to establishing a connection with the baddie. Once any instruction is complete, the provider 127 may play a predefined message informing the operator and/or victim when the connection with the baddie is being established.

In some embodiments, the operator may indicate via interface selections provided by the CC module 141 or via key-in commands with the native dialer that the victim and operator are ready to dial out 525 to the baddie's contact device 105B and begin the operator monitored portion of the call. For example, if the operator is confident that the victim is ready to proceed and speak with the baddie, the operator may key-in * on the native dialer of the contact device.

To begin the monitored portion of the call between the victim and baddie, the agency service 115 instructs the provider 127 to dial out 525 to the specified transmitting number of the baddies's contact device 105B using the number identity (e.g., from transmitting number) of the victim's contact device 105A. Thus, when the baddie receives the connection request on their contact device 105B, the call appears to originate from the victim. Accordingly, the contact device 105B will display number information for the transmitting number of contact device 105A rather than the operator device 101 or the CC number.

If the contact device 105B picks up, the provider 127 establishes 530 a connection between the contact device 105A and the contact device 105B (e.g., through the CC number) with audio enabled such that the line of communication appears to be an ordinary call from the victim. However, unlike an ordinary call, the provider 127 also maintains the existing connection 520 with the operator device 101. Thus, the operator device 101 receives audio data which allows the operator to monitor 531 the call. In order to prevent tipping off the baddie, the agency service 115 may instruct 523 the provider 127 to disable audio communications from the operator device 101 to the contact devices 105.

In addition to monitoring 531 the controlled call, the operator device 101 may transmit commands that specify actions the provider 127 and/or agency service 115 should take during the controlled call. For example, the commands may cause the provider 127 to start or stop recording of audio and disconnect a contact device 105 or otherwise terminating the connection between the contact device 105A and the contact device 105B. Termination of the established connection 530 between the contact devices 105 may be performed in a manner consistent with ordinary call functions to avoid tipping off the baddie. For example, the operator device 101 may instruct the provider 127 to simulate the victim hanging up on the baddie or the victim's contact device 105A dropping the call. The controlled call may also be terminated when both contacts 105A, 105B disconnect on their own as there is no audio for the operator device 101 to monitor 531.

The provider 127 and/or the agency service 115 may update 535 the appliance 150 with recorded audio data from the controlled call. The agency service 115 or provider 127 may also update 535 the appliance with any other data received from the provider 127 and/or operator device 101. For example, the provider 127 may transmit data collected from the operator device 101 to the agency service 115 or appliance 150 to update 535 the appliance over the network 120. Data collected from the operator device 101 may include a recorded preempt message describing the purpose of the controlled call and location data from GPS receivers and other direction mechanisms coupled to the operator device. The operator device 101 may determine a location measurement including the position of the operator device, direction and speed of the operator device and associated accuracy of the measurement. In some embodiments, the operator device 101 determines and transmits the location measurements in real-time to the agency service 115.

In one embodiment, after the controlled call is completed, the agency service 115 may notify the operator that the recorded audio is available from the agency service 115 or appliance 150. For example, the agency service 115 may transmit an e-mail to the operator or instruct the provider 125 to transmit a text message to the transmitting number of the operator device 101 reading: "To listen to the controlled call, visit URL [www.example.com/transmittingnumber] and enter PIN [random#]". Accordingly, by accessing the URL (e.g., provided by the interface 145) and entering the PIN the operator may playback the controlled call and/or create an account for viewing the controlled calls they administrate.

Monitoring a Controlled Call

Figure 6:
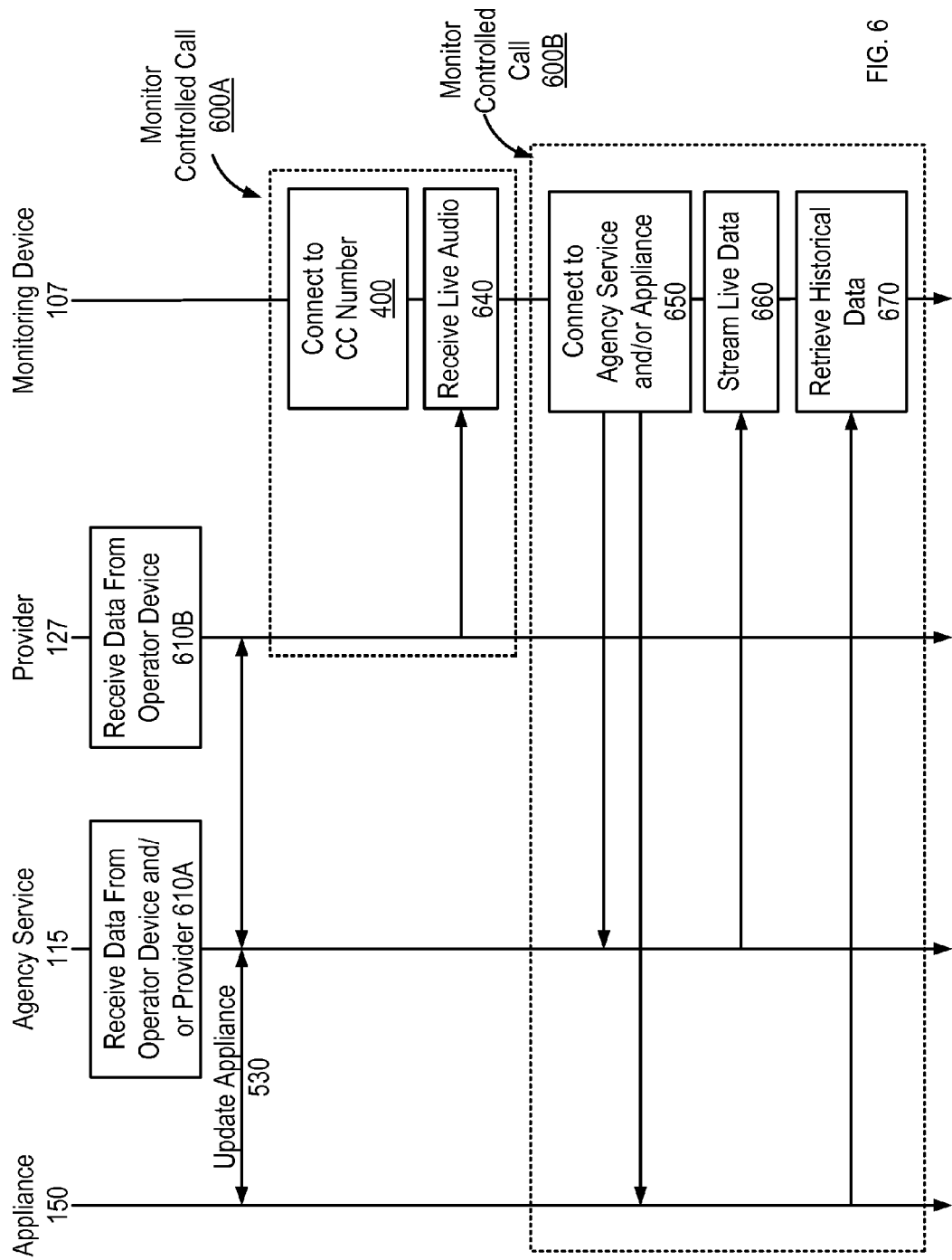
FIG. 6 is an interaction diagram illustrating a method for monitoring a controlled call according to one example embodiment.

FIG. 6 is an interaction diagram illustrating a method for monitoring 600 an operator device 101 according to one example embodiment. As described above, the agency service 115 receives 610A collected data from the operator device 101 and/or the provider 127. Additionally, the provider 127 may receive data 610B from the operator device 101. In turn, the agency service 115 and/or provider 127 may update 530 the appliance at the agency 110. In some cases, it may be desirable for personnel other than the operator to monitor or listen in on the controlled call in real-time or near real-time and access previously administrated calls. A monitoring device 107 may subsequently monitor 600A, 600B the operator device 101 using one or both of the processes outlined below.

In one embodiment, the monitoring device 107 connects 400 to a CC number for monitoring 600A the controlled call. The monitoring device 107 may be connected 400 by dialing a CC number directly as described with reference to the operator device in FIG. 4. However, instead of authenticating as an operator device 101 for administrating the controlled call, the connecting device is identified as a monitoring device 107 (e.g., from the mapping table by a transmitting number of the device or a provided PIN).

A connection between the monitoring device 107 and the CC number is established and, similarly to the operator device 101, the monitoring device 640 receives the live audio from the controlled call and outgoing audio is disabled. The monitoring device 107, however, is unable to control the call. To continue monitoring 600A the controlled call, the monitoring device 107 simply maintains the connection 400 with the CC number.

In another embodiment, the monitoring device 107 connects 650 to the agency service 115 and/or appliance 150 for monitoring 600B the controlled call. The monitoring device 107 may establish the connection 650 using a web browser or monitoring module 140 that retrieves or streams collected data via a monitoring interface on the appliance 150 or agency service 115 (e.g., monitoring interface 145).

In one example embodiment, the monitoring device 107 streams 660 audio and/or location measurements in real-time from the agency service 115. In some embodiments, the appliance 150 also supports real-time monitoring. In addition, the monitoring device 107 can retrieve 670 historical data stored on the appliance 150 to view previously administrated operator device 101 controlled calling sessions 500. For example, when a controlled call recording is complete, the session may be replayed on the monitoring device 107 or an operator device 101 by connecting 650 to the appliance 150 or agency service 115 where the evidence/recorded data is stored. However, for example, if the recording was stopped at any point during the controlled call, or the recording was canceled, a notification may accompany a timeline indicating the portions of that call that were not recorded. Recorded preempt messages may be merged with the call recording or provided as separate audio files for playback.

In some instances, the monitoring device 107 receives notifications from the monitoring interface 145 for display in the web browser or with the monitoring module 140. Example notifications include audio or visual alerts for notifying personnel when the operator device 101 ends the controlled call.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method comprising:
provisioning a virtual number based on number information received for the virtual number;
receiving mapping information for the virtual number, the mapping information comprising authentication data for identifying at least one of an authorized operator of a given telephonic device and an authorized telephonic device;
storing the virtual number in the mapping table in association with the authentication data;
receiving authentication information from a target telephonic device in response to a request for administrating a controlled call with the virtual number, the controlled call established through the virtual number and enabling an operator device to monitor and control audio communications between a first contact device and a second contact device;
authenticating the target telephonic device as the operator device based on agreement of the authentication information received from the target telephonic device and the authentication data stored in association with the virtual number in the mapping table;
receiving, from the operator device, device information corresponding to the first contact device and the second contact device for setting up the controlled call, a first command to begin the controlled call, and a second command to end the controlled call; and
transmitting, in response to receiving the first command, instructions for:
establishing, through the virtual number, a connection enabling the audio communications between the first contact device and the second contact device to begin the controlled call, the second contact device receiving device information associated with the first contact device when receiving a request to establish the connection such that the connection request appears to be from the first contact device;
transmitting the audio communications between the first contact device and the second contact device received over the connection to the operator device; and
disabling audio communications from the operator device to the first contact device and the second contact device; and
transmitting, in response to receiving the second command, instructions for terminating the connection enabling the audio communications between the first contact device and the second device to end the controlled call.

2. The method of claim 1, wherein the device information received from the operator device includes a transmitting number of the first contact device and a transmitting number of the second contact device.

3. The method of claim 1, wherein the authentication information received from the target telephonic device includes at least one of a transmitting number of the target telephonic device and a personal identification number provided by a user of the target telephonic device.

4. The method of claim 3, wherein the target telephonic device is authenticated as the operator device in response to agreement of at least one of the transmitting number of the target telephonic device and the personal identification number of provided by the user of the target telephonic device with an authentication number stored in association with the virtual number in the mapping table, the authentication number included in the authentication data and identifying the authorized operator or the authorized telephonic device.

5. The method of claim 1, further comprising determining number information about the first contact device, the number information determined about the first contact device including one or more of automatic number identification information and caller identification information associated with a transmitting number of the first contact device.

6. The method of claim 5, wherein a portion of the number information determined about the first contact device is transmitted to the second contact device when establishing the connection enabling the audio communications between the first contact device and the second contact device to begin the controlled call.

7. The method of claim 1, further comprising, in response to authenticating the target telephonic device as the operator device, transmitting instructions for at least one of connecting the operator device with the virtual number, enabling the operator device to administrate the controlled call with the virtual number, and record an audio message for describing a context of the controlled call.

8. The method of claim 1, further comprising transmitting instructions for connecting the operator device with the first contact device through the virtual number prior to establishing the connection enabling the audio communications between the first contact device and the second contact device, and enabling audio communications between the first contact device and the operator device for a period of time prior to establishing the connection between the first contact device and the second contact device, and wherein the instructions for connecting the operator device with the first contact device through the virtual number cause the first contact device to receive the number information for the virtual number.

9. The method of claim 1, wherein the instructions for establishing the connection enabling the audio communications between the first contact device and the second contact device through the virtual number to begin the controlled call further comprise instructions for at least one of:
recording of the audio communications between the first contact device and the second contact device; and
enabling the operator device to end the controlled call with the second command.

10. The method of claim 1, further comprising providing a module to the operator device for interfacing with features of the operator device and performing at least one of:

a step for obtaining, prior to transmitting the authentication information to the virtual number, the device information corresponding to each contact device and the virtual number for administrating the controlled call;

a step for providing the device information corresponding to each contact device in response to the authentication of the operator device;

a step for recording an audio message for describing a context of the controlled call;

a step for providing the first command to begin the controlled call; and a step for providing the second command to end the controlled call.

11. A system for administrating a controlled call between a first contact device and a second contact device using a virtual number, the system comprising:

a server comprising one or more processors and a non-transitory computer-readable storage medium storing computer program code, the computer program code when executed by a processor performing steps to:

provision a virtual number based on number information received for the virtual number;

receive mapping information for the virtual number, the mapping information comprising authentication data for identifying at least one of an authorized operator of a given telephonic device and an authorized telephonic device;

store the virtual number in the mapping table in association with the authentication data;

receive authentication information from a target telephonic device in response to a request for administrating a controlled call with the virtual number, the controlled call established through the virtual number and enabling an operator device to monitor and control audio communications between the first contact device and the second contact device;

authenticate the target telephonic device as the operator device based on agreement of the authentication information received from the target telephonic device and the authentication data stored in association with the virtual number in the mapping table;

receive, from the operator device, device information corresponding to the first contact device and the second contact device for setting up the controlled call, a first command to begin the controlled call, and a second command to end the controlled call; and transmit, in response to receiving the first command, instructions to:

establish, through the virtual number, a connection enabling the audio communications between the first contact device and the second contact device to begin the controlled call, the second contact device receiving device information associated with the first contact device when receiving a request to establish the connection such that the request appears to be from the first contact device;

transmit the audio communications between the first contact device and the second contact device received over the connection to the operator device; and disable audio communications from the operator device to the first contact device and the second contact device; and transmit, in response to receiving the second command, instructions for terminating the connection enabling the audio communications between the first contact device and the second device to end the controlled call.

12. The system of claim 11, wherein the device information received from the operator device includes a transmitting number of the first contact device and a transmitting number of the second contact device.

13. The system of claim 11, wherein the authentication information received from the target telephonic device includes at least one of a transmitting number of the target telephonic device and a personal identification number provided by a user of the target telephonic device.

14. The system of claim 13, wherein the target telephonic device is authenticated as the operator device in response to agreement of at least one of the transmitting number of the target telephonic device and the personal identification number of provided by the user of the target telephonic device with an authentication number stored in association with the virtual number in the mapping table, the authentication number included in the authentication data and identifying the authorized operator or the authorized telephonic device.

15. The system of claim 11, further comprising determining number information about the first contact device, the number information determined about the first contact device including one or more of automatic number identification information and caller identification information associated with a transmitting number of the first contact device.

16. The system of claim 15, wherein a portion of the number information determined about the first contact device is transmitted to the second contact device when establishing the connection enabling the audio communications between the first contact device and the second contact device to begin the controlled call.

17. The system of claim 11, further comprising, in response to authenticating the target telephonic device as the operator device, transmitting instructions for at least one of connecting the operator device with the virtual number, enabling the operator device to administrate the controlled call with the virtual number, and record an audio message for describing a context of the controlled call.

18. The system of claim 11, further comprising transmitting instructions for connecting the operator device with the first contact device through the virtual number prior to establishing the connection between the first contact device and the second contact device, and enabling audio communications between the first contact device and the operator device for a period of time prior to establishing the connection between the first contact device and the second contact device, and wherein the instructions for connecting the operator device with the first contact device through the virtual number cause the first contact device to receive the number information for the virtual number.

19. The system of claim 11, wherein the instructions for establishing the connection between the first contact device and the second contact device through the virtual number to begin the controlled call further comprise instructions for at least one of:

recording of the audio communications between the first contact device and the second contact device; and enabling the operator device to end the controlled call with the second command.

20. The system of claim 11, further comprising providing a module to the operator device for interfacing with features of the operator device and performing at least one of:

a step for obtaining, prior to transmitting the authentication information to the virtual number, the device information corresponding to each contact device and the virtual number for administrating the controlled call;

a step for providing the device information corresponding to each contact device in response to the authentication of the operator device;

a step for recording an audio message for describing a context of the controlled call;

a step for providing the first command to begin the controlled call; and a step for providing the second command to end the controlled call.

* * * * *